UNITED STATES PATENT OFFICE.

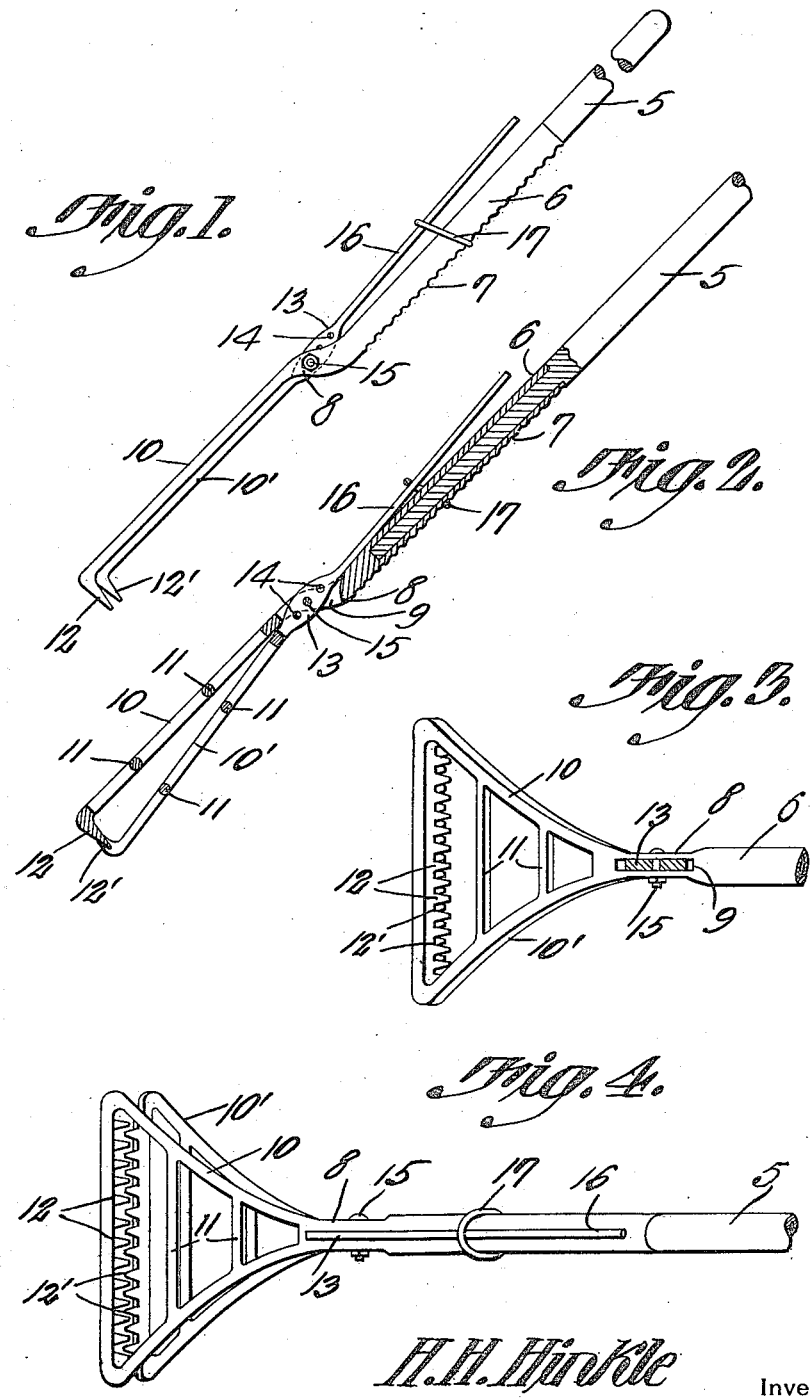

HORACE H. HINKLE, OF GRANDFIELD, OKLAHOMA.

COMBINATION MOP-HOLDER AND RAKE.

1,075,568.  Specification of Letters Patent.  Patented Oct. 14, 1913.

Application filed February 10, 1913. Serial No. 747,463.

*To all whom it may concern:*

Be it known that I, HORACE H. HINKLE, a citizen of the United States, residing at Grandfield, in the county of Tillman and State of Oklahoma, have invented a new and useful Combination Mop-Holder and Rake, of which the following is a specification.

The present invention appertains to a combination mop holder and rake, and aims to provide a novel and improved device which may ordinarily be employed as a mop holder, but which shall be convertible into a hand rake.

With the foregoing general and primary object outlined and with other objects in view, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein similar reference characters have been employed to denote corresponding parts, and wherein:—

Figure 1 is a side elevation of the device as adjusted to provide a rake, part of the handle being broken away. Fig. 2 is a sectional view of the device showing the parts adjusted to provide the mop holder. Fig. 3 is the top view of the parts shown in Fig. 1, portions being broken away. Fig. 4 is a top view of the parts as depicted in Fig. 2.

Referring specifically to the drawing, the numeral 5 designates a handle, which is preferably constructed of wood but which may be fashioned of any other suitable material. A ferrule 6 is engaged over the lower or outer end of the handle 5 and is preferably of considerable length. The ferrule is also preferably provided with a series of lateral corrugations or notches 7 along its lower side, and at its outer end merges into the shank 8 having a slot 9 therein. The shank 8 merges into or is secured to the frame 10, which is approximately triangular with one corner or its apex attached to the shank 8. The shank thus connects the frame 10 with the ferrule or with the handle, and is preferably off-set slightly upward or to the side, opposite the side having the corrugations 7. The skeleton frame 10 is also preferably provided with cross pieces or braces 11 connecting its sides, and the base or outer end of the frame 10 is provided with a row or series of teeth 12 which project at right angles to the plane of the frame.

A skeleton frame 10' similar to the frame 10 complements the latter frame and has a row or series of teeth 12' projecting at right angles from its outer end or base. The sides of the frame 10' are also connected by the cross pieces or braces 11, and the frame 10' is further provided with a shank 13 projecting from its inner end or apex. The teeth 12 are preferably slightly longer than the teeth 12', the difference being equal to the thickness of one of the frames. The respective rows or series of teeth are also in staggered relation in order that when the teeth project toward each other, they may come together. The shank 13 of the frame 10' is preferably flattened and passes through the slot 9 of the shank 8, the shank 13 being preferably provided with a series or plurality of apertures 14.

A bolt or other pivot member 15 is passed through the shank 8 and through one of the openings 14 so as to pivot the frames 10 and 10' together. This bolt 15 is removable in order that the frame 10' may be detached or liberated, and in order that the frame 10' may be reversed. The apertures 14 also permit the frame 10' to be adjusted longitudinally relative to the frame 10 for the purpose which will hereinafter appear.

The shank 13 merges into a stem 16 which extends along the ferrule 7 or along the outer or lower end of the handle, a ring or similar member 17 embracing the stem 16 and the ferrule or outer end of the handle. It will be obvious that the ring 17 may be set or adjusted longitudinally to hold the stem 16 under tension so that the frame 10' will be held against the frame 10, the ring 17 being adapted to engage the corrugations or notches 7 to prevent its accidental or casual movement or displacement.

In use, when the device is employed as a mop holder, the frame 10' is pivoted to the frame 10 so that the teeth of the two frames will project toward each other, and in order that the teeth of one frame may enter between the teeth of the other frame, it being noted that the teeth of the lower frame 10' are shorter than the teeth of the upper frame 10 which enables the mop or other article to be effectively held between the teeth.

It is apparent that any form of mop, or in fact any suitable article may be engaged between the respective teeth, after which, the ring 17 may be slid upwardly or inwardly so as to hold the frame 10' firmly in position.

When it is desired to convert the device into a hand rake, the frame 10' may be readily removed by withdrawing the bolt or pivot member 15, in which event the frame 10 and its teeth 12 provide the rake head having a single row of teeth. If it is desired and it is preferable, to have a double row of teeth, the frame 10' is reversed, the shank 13 thereof being inserted together with the stem 16 through the slot 9 of the shank 8 in a reversed manner, as will be apparent. The bolt 15 is again inserted through the shank 8 and through the proper aperture 14 of the shank 13 in order that the frame 10' may swing flatly against the bottom of the frame 10 and in order that the teeth 12' may swing within the row of teeth 12. Thus, a double row of rake teeth are provided, the teeth of the respective rows being in staggered relation so that the rake will be most effective in use. It is also to be noted that the teeth 12' being shorter than the teeth 12 will bring all of the points of the teeth 12' even with the tips or ends of the teeth 12, which is highly desirable. Conversely, the device may be converted from a rake into a mop holder, the several parts being proportioned and designed to accomplish this result in a most effective manner.

The present device is comparatively simple, substantial, compact, and inexpensive in construction, may be constructed from various materials and in various sizes and proportions, and in use is serviceable, efficient and convenient.

What is claimed is:—

1. In a device of the character described, a frame attachable to a handle having a row of teeth disposed at right angles with the frame, and a second frame pivoted to the aforesaid frame and having a row of complementary teeth disposed at right angles with the last mentioned frame, the last mentioned frame being reversible so that the respective rows of teeth may project toward each other, or in order that the last mentioned frame may rest against the former frame with the respective rows of teeth in parallel planes.

2. In a device of the character described, a frame attachable to a handle and having a row of teeth, and a second frame pivoted to the aforesaid frame and having a complementary row of teeth, the latter frame being reversible and longitudinally adjustable so that the respective rows of teeth may project toward each other, or in order that the latter frame may rest against the bottom of the former frame with the respective rows of teeth in parallel planes, the teeth of the latter frame being shorter than those of the former frame.

In testimony that I claim the foregoing as my own, I have hereto affixed my signature in the presence of two witnesses.

HORACE H. HINKLE.

Witnesses:
GEO. W. BINGHAM,
W. R. SANNER.